April 5, 1949.  D. W. KELBEL  2,466,244
VARIABLE SPEED TRANSMISSION
Filed May 18, 1944
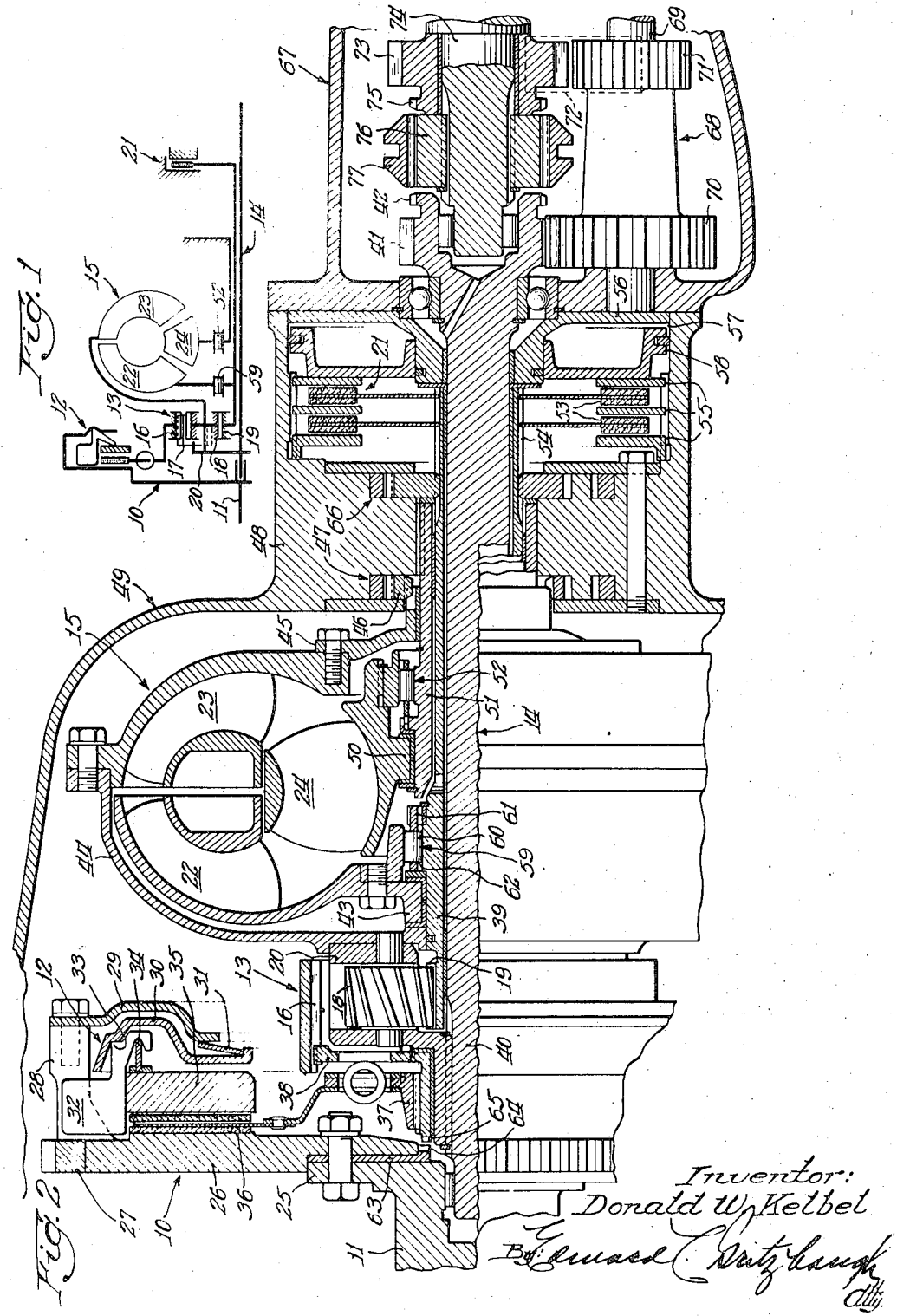
Inventor:
Donald W. Kelbel Patented Apr. 5, 1949

2,466,244

UNITED STATES PATENT OFFICE 2,466,244

VARIABLE-SPEED TRANSMISSION

Donald W. Kelbel, Muncie, Ind., assignor to Borg-Warner Corporation, Chicago, Ill., a corporation of Illinois Application May 18, 1944, Serial No. 536,106

17 Claims. (Cl. 74—720)

This invention relates to power transmitting devices adapted to produce a variable speed and torque ratio drive between the driving and driven structures thereof. For purposes of illustration it will be described with reference to an infinitely variable hydro-dynamic torque convertor combined with gearing, although it is to be understood that the invention is not to be limited to any particular type of infinitely variable torque multiplying device.

The principal object of this invention is to provide an infinitely variable torque multiplying transmission for an automotive vehicle or the like wherein an infinitely variable torque multiplying device is combined with differential gearing in a manner to provide a two-path power flow arrangement for certain speeds of the vehicle, and above the predetermined speed to provide a purely mechanical overdrive ratio.

A more specific object of this invention is to provide a transmission for an automotive vehicle in which a vaned type hydro-dynamic torque convertor is combined with planetary gearing in such a manner that up to a certain vehicle speed the torque is transmitted through the gearing in such a manner that part of the torque is transmitted directly to the load and the remainder is transmitted through the torque convertor, with means for rendering the convertor ineffective and at the same time changing the drive to a purely mechanical drive through the gearing to produce an overdrive ratio.

These and other objects and features of the invention will become apparent from the following detailed description when taken together with the accompanying drawing in which:

Fig. 1 is a schematic diagram of the principal torque transmitting elements of the transmission; and Fig. 2 is a partial section through the principal torque transmitting elements shown in their preferred arrangement and proportion.

Referring now to Fig. 1 for a general description of the invention, the driving structure is shown at 10 and may comprise a drive shaft 11 which is connected to a suitable prime mover (not shown) such as an internal combustion engine and is adapted to drive an automatic friction clutch 12 which, in turn, drives a differential gear set 13 in such a manner that part of the torque is transmitted directly to a driven structure 14 and part is transmitted to an infinitely variable torque multiplying device 15 which is likewise connected through the gearing to the driven structure 14.

Gearing 13 is comprised of an internal or ring gear 16 which meshes with planet gears 17 of the one or more pairs of intermeshed planet gears 17 and 18, and a sun gear 19 which meshes with the planet gears 18 of said pairs of intermeshed gears. A carrier 20 supports the pairs of planet gears 17 and 18 and forms part of the driven structure 14. A brake 21 is adapted to hold sun gear 19 against rotation to provide an overdrive ratio through the planetary gearing 13 when the ring gear 16 is the driver.

The infinitely variable torque multiplying device 15 is comprised of an input element 22, an output element 23 and a reaction element 24, output element 23 being directly connected to carrier 20 and thus to driven structure 14.

When brake 21 is released the drive will be from drive shaft 11 through clutch 12 to gearing 13 wherein it is split into two paths, part of it being transmitted to output structure 14 and the remainder being transmitted to torque convertor 15 where it is multiplied before being impressed upon output structure 14. The speed and torque ratio between drive shaft 11 and output structure 14 will vary depending upon the load, the ratio being highest and producing the greatest torque multiplication when the load is greatest and diminishing in infinite steps until it approaches a one-to-one ratio. It is contemplated that a further torque multiplication will be provided between the driven structure and the load and that this further torque multiplication will be in the neighborhood of 4.25 to 1. When used in an automotive vehicle this additional torque multiplication will be effected by means of the rear axle differential gearing. With such additional torque multiplication it is desirable to use an overdrive ratio between drive shaft 11 and driven structure 14 so as to take full advantage of the torque available in the prime mover.

When brake 21 is engaged to hold sun gear 19 against rotation while ring gear 16 is being driven, the dual planet construction will cause carrier 20 to be driven at an overdrive with respect to drive shaft 11 and this overdrive will be transmitted directly to driven structure 14.

Referring now to Fig. 2 for a detailed description of a preferred embodiment of the invention, the drive shaft 11 is shown provided with a flange 25 to which is bolted a fly wheel 26 having a starting gear 27 secured to the periphery thereon. Said fly wheel 26 has axially extending lugs 28 to which is bolted a clutch cover 29. A reaction plate 30 is supported from and driven by fly wheel 26 by suitable means (not shown) and is connected to cover 28 through a Bellville type spring 31. Reaction plate 30 supports a plurality of centrifugal weights 32 which pivot at 33 on reaction plate 30 and transmit centrifugal force through struts 34 to a pressure plate 35. A clutch plate 36 is mounted between pressure plate 35 and fly wheel 26 and is adapted to transmit torque from the fly wheel through a hub member 37 to a flanged forging 38 to which it is splined. Said flanged forging 38 supports and drives ring gear 16 which, as previously described with reference to Fig. 1, meshes with a planet pinion 17 mounted on carrier 20. Pinion 18 meshes with pinion 17 and also with sun gear 19 which may be formed at one end of a hollow shaft 39. Carrier 20 is in turn splined to a shaft 40 which is part of the driven structure 14 shown in Fig. 1. Said shaft 40 passes through hollow shaft 39 and terminates in a gear 41 and a positive clutch element 42. The functions of gear 41 and clutch 42 will be described hereinafter.

Torque convertor 15 is comprised of a vaned impeller 22 which may be formed as a casting having a flange 43 by which it is rotatably mounted on hollow shaft 39. Torque convertor 15 is also provided with a vaned turbine member 23 which forms a portion of the housing for the convertor and is bolted to another portion 44 of the housing, the latter being directly connected to carrier 20 and hence directly associated with the output structure 14. Also bolted to turbine member 23 is a forging 45 which is connected to the drive pinion 46 of a pump 47 mounted in a reduced portion 48 of transmission housing 49. Torque convertor 15 also includes a vaned stator element 24 which is likewise in the form of a casting having a flange 50 by which it is rotatably mounted upon a fixed sleeve 51 surrounding hollow shaft 39 and extending into portion 48 of housing 49 to which it is non-rotatably anchored. A roller-and-cam type coupling 52 automatically prevents relative rotation between stator 24 and sleeve 51 when stator 24 tends to rotate in a reverse direction relative to drive shaft 11 but permits such relative rotation when the rotational tendency is in a forward direction. All of the vanes of the convertor are preferably immersed in a fluid under pressure supplied by pump 47 or some other suitable source of fluid under pressure.

Brake 21 is comprised of one or more friction discs 53, which are splined at 54 to hollow shaft 39, and non-rotatable plates 55 between which friction discs 53 are adapted to be compressed. Reduced portion 48 of housing 49 is closed at its right hand end (Fig. 2) by a casting 56 which together with reduced portion 48 forms an annular cylinder 57 in which is retained a piston 58. Said piston 58 when moved to the left (Fig. 2) under the influence of fluid under pressure, will compress friction discs 53 between plates 55 and hold hollow shaft 39 and its associated sun gear 19 against rotation. Because of the dual planet arrangement, shaft 40 will be driven at an overspeed with respect to driving shaft 11 when ring gear 16 is the driver and sun gear 19 is the reaction element.

It will be observed that since turbine element 23 is directly connected to carrier 20, said turbine member 23 will be compelled to rotate with the carrier whenever the sun gear 19 is stationary as in overdrive. If impeller member 22 were rigidly attached to sleeve 39 under such conditions a tremendous power loss would result in the convertor. To eliminate this power loss the connection between sun gear 19 and its associated sleeve 39 and impeller 22 is made automatically releasable so that pump impeller 22 may rotate ahead of sleeve 39 if conditions should warrant such movement but will be driven by hollow shaft 39 if said shaft tends to rotate ahead of impeller 22. The releasable connection for accomplishing this result is shown at 59 and comprises a roller-and-cam type overrunning clutch of any well known design having a plurality of rollers 60 controlled by a roller cage 61 in such a manner with respect to cams 62 formed on sleeve 39 that sleeve 39 will drive pump element 22 when the latter tends to lag behind the sleeve and will be free of impeller 22 when the latter tends to rotate ahead of the sleeve.

Under certain conditions it is desirable to drive shaft 11 from driven structure 14, as for example when it is desired to start the engine of a vehicle by towing or pushing the vehicle. Since clutch 12 is energized only from the driving shaft it is necessary to provide a substitute connection between the driving and driven structures. To that end a plate 63 is bolted to drive shaft 11 and is provided with axially extending teeth 64. A corresponding set of teeth 65 is formed in the end of flanged forging 38 to which hub 37 of friction plate 36 is splined. Said flanged forging 38 is adapted to slide axially on carrier 20 so as to engage teeth 65 with teeth 64. It is contemplated that the teeth of differential gearing 13 will be helical and cut in such a direction that when drive shaft 11 is driving and clutch 12 is operative to drive ring gear 16, the latter will be urged by relative torque reaction in an axial direction to the right as shown in Fig. 2 until flange 38 abuts carrier 20 and that when carrier 20 is the driver and ring gear 16 is the driven member, the torque reaction will be such as to move ring gear 16 and its associated forging 38 to the left as shown in Fig. 2 to engage teeth 65 with teeth 64.

Thus in order to start the prime mover associated with shaft 11 by towing or pushing the vehicle, shaft 40 is rotated, thereby rotating carrier 20 and turbine element 23 and also tending to rotate sun gear 19. The torque reaction between planet pinions 17 and ring gear 16 will be such as to cause engagement between teeth 65 and 64 thereby making ring gear 16 the load member for the drive. Sun gear 19, however, will tend to rotate freely but at an overspeed with respect to carrier 20 and therefore impeller 22 will be effective to energize the fluid within torque converter 15 and thus tend to lock carrier 20 to sun gear 19. This locking tendency will result in a driving effort which will be impressed upon ring gear 16 and transmitted through teeth 65 and 64 directly to drive shaft 11. Just as soon as the prime mover takes over the drive, the torque reaction on ring gear 16 will be in the opposite sense and the ring gear and its associated forging 38 will be moved to the right as shown in Fig. 2 to disengage teeth 65 from teeth 64.

Since pump 47 is driven only when turbine element 23 of torque converter 15 is rotating and since turbine element 23 rotates only when the driven structure 14 and shaft 40 are rotating it will be apparent that whenever the vehicle is at rest and the engine is idling, as for example when the vehicle is at the curb preparatory to starting or is at a stop light, there will be no pressure available to supply fluid to converter 15 and if at that time the converter should be substantially empty through normal drainage, there may be a time lag between the speed up of the engine preparatory to getting away and the building up of sufficient torque within the converter to start the vehicle. For this reason a second pump 66 is provided, the second pump being driven directly by hollow shaft 39 and sun gear 19. Thus when shaft 40 is stationary under the conditions just described and pump 47 is not being driven, sun gear 19 will be rotated at an overdrive with respect to shaft 11 so that even though drive shaft 11 is idling, sun gear 19 and its associated sleeve 39 will be rotating at a sufficiently high speed to energize pump 66 and maintain converter 15 full of fluid under pressure. Thus converter 15 will be immediately effective to multiply torque and accelerate the vehicle when drive shaft 11 is speeded up. It is understood that suitable conduits (not shown) will be provided between pumps 47 and 66 and converter 15.

Inasmuch as the combined torque converter and planetary gearing above described does not provide a reverse drive, an auxiliary mechanism is supplied for this purpose. This auxiliary mechanism is shown generally at 67 and includes in addition to gear 41 and clutch teeth 42 the cluster gear 68 rotatably mounted upon a countershaft 69 and comprising a gear 70 meshing with gear 41 and a gear 71 which meshes with an idler gear 72, the latter meshing with a gear 73 mounted for rotation on a propeller or load shaft 74. Gear 73 is provided with clutch teeth 75 and load shaft 74 has splined thereon a hub 76 on which is slidably splined a shift collar 77. Said shift collar 77 may assume either a neutral position as shown in Fig. 2 wherein neither clutch teeth 42 nor clutch teeth 75 is engaged thereby, or it may be slid in either direction to engage one or the other of said clutch teeth. When engaged with clutch teeth 42 a direct drive is established between shafts 40 and 74. When it is engaged with teeth 75 a reverse drive is established between shaft 40 and 74 through gearings 41, 70, 71, 72 and 73.

It is understood that suitable bearings, fasteners and connecting elements will be used throughout the preferred embodiment, such bearings, fasteners and connectors being readily designed by one skilled in the art and hence not described in detail herein. It is further understood that the foregoing description is merely illustrative of a preferred embodiment of the invention and that the scope of the invention therefore should not be limited thereto but should be determined by the appended claims.

I claim:

1. A variable ratio torque transmitting mechanism comprising input and output structures, differential gearing connecting said structures and comprising a ring gear driven by the input structure, a planet carrier connected to drive the output structure, a pair of intermeshed planet gears carried by the planet carrier, and a sun gear, one of said planet gears meshing with the ring gear and the other with the sun gear; an infinitely variable torque multiplying device having driving, driven and reaction elements; releasable drive means connecting the sun gear to the driving element, means connecting the driven element to the carrier, and releasable means for arresting rotation of the sun gear to provide a fixed overdrive ratio between the input and output structures, said releasable drive means allowing the driving element to rotate free of said sun gear when said overdrive ratio is operative.

2. A variable ratio torque transmitting mechanism comprising input and output structures, differential gearing connecting said structures and comprising a ring gear driven by the input structure, a planet carrier connected to drive the output structure, a pair of intermeshed planet gears carried by the planet carrier, and a sun gear, one of said planet gears meshing with the ring gear and the other with the sun gear; an infinitely variable torque multiplying device having driving, driven and reaction elements; one-way drive means connecting the sun gear to the driving element in a manner to release drive therebetween when the driving element tends to rotate ahead of the sun gear, means connecting the driven element to the carrier, and releasable means for arresting rotation of the sun gear to provide a fixed overdrive ratio between the input and output structures, said one-way drive means allowing the driving element to rotate free of said sun gear when said overdrive ratio is operative.

3. A variable ratio torque transmitting mechanism comprising input and output structures, differential gearing conecting said structures and comprising a ring gear driven by the input structure, a planet carrier connected to drive the output structure, a pair of intermeshed planet gears carried by the planet carrier, and a sun gear, one of said planet gears meshing with the ring gear and the other with the sun gear; a hydraulic torque convertor having pump, turbine and stator elements, one-way drive means connecting the sun gear to the pump element in a manner to permit the pump element to overrun the sun gear, means connecting the turbine element to the carrier, and releasable means for arresting rotation of the sun gear to provide a fixed overdrive ratio between the input and output structures, said one-way drive means allowing the pump element to rotate free of said sun gear when said overdrive ratio is operative.

4. A variable ratio torque transmitting mechanism comprising an input structure, an output shaft, differential gearing connecting the input structure to the output shaft and comprising a ring gear driven by the input structure, a planet carrier connected to drive the output shaft, a pair of intermeshed planet gears carried by the planet carrier, and a sun gear, one of said planet gears meshing with the ring gear and the other with the sun gear; said output shaft passing through the differential gearing and having one end in proximity to the input structure; an infinitely variable torque multiplying device having driving, driven and reaction elements, a hollow shaft surrounding the output shaft and passing through the infinitely variable torque multiplying device, said shaft being directly driven by the sun gear at one end, releasable drive means connecting the hollow shaft to the driving element, means connecting the driven element to the carrier, and releasable brake means connected to the other end of the hollow shaft for arresting the sun gear to provide a fixed overdrive ratio between the input structure and the output shaft.

5. A variable ratio torque transmitting mechanism as described in claim 4, and a pump connected to the driven element for supplying fluid to the infinitely variable torque multiplying device.

6. A variable ratio torque transmitting mechanism as described in claim 4, and a pump driven by the hollow shaft for supplying fluid under pressure to the infinitely variable torque multiplying device when the driven element is stationary.

7. A variable ratio torque transmitting mechanism as described in claim 4, a fixed cylindrical member surrounding the hollow shaft and a releasable connection between the fixed cylindrical member and the reaction element.

8. A variable ratio torque transmitting mechanism comprising an input structure, a driven shaft, a differential gearing connecting the input structure with the driven shaft and comprising a ring gear adapted to be driven by the input structure, a planet carrier connected to drive the driven shaft, a pair of intermeshed planet gears carried by the planet carrier, and a sun gear, one of said planet gears meshing with the ring gear and the other with the sun gear; a hydraulic torque convertor having pump, turbine and stator elements; one-way clutch means for connecting the sun gear to the pump element and constructed to permit the pump element to overrun the sun gear, a housing for the convertor rotatable with the turbine element and connected to the planet carrier, a hollow shaft extending through the torque convertor and adapted at one end to be driven by the sun gear, a brake adapted to cooperate with the other end of the hollow shaft to hold the shaft and sun gear against rotation to provide a fixed overdrive ratio between the input structure and driven shaft, a fixed cylindrical element surrounding the hollow shaft, one-way connecting means between the stator element and the fixed hollow cylindrical member, a pump for supplying the convertor with fluid under pressure and adapted to be driven by the hollow shaft, and a second pump adapted to be driven by the housing.

9. A torque transmitting mechanism comprising input and output structures, an automatic clutch energized by rotation of the input structure and connected to receive drive therefrom, means for transmitting the drive from the clutch to the output structure, said means including an axially reciprocable element which is responsive to torque, and a clutch for by-passing the automatic clutch and connecting the output structure to the input structure, said clutch being energized by the torque responsive element.

10. A torque transmitting mechanism as described in claim 9, said means for transmitting the drive from the automatic clutch to the output structure comprising gearing having helical teeth such that axial thrusts are developed, and said axially reciprocable element being directly connected to the gearing.

11. A torque transmitting mechanism as described in claim 9, said means for transmitting the drive from the automatic clutch to the output structure comprising planetary gearing having helical teeth such that axial thrusts are developed and including a ring gear driven directly by the automatic clutch, and said axially reciprocable element being directly connected to the ring gear.

12. A variable ratio torque transmitting mechanism comprising input and output structures, differential planetary gearing connecting said structures and comprising a ring gear element, a planetary carrier element, a pair of intermeshed planet gears carried by said last mentioned element, a sun gear element one of said planet gears meshing with said sun gear element and the other with said ring gear element, one of said elements being driven by said input structure, another of said elements being connected to said output structure, a torque multiplying device having driving and driven members, automatically releasable drive means connecting one of said elements to said driving member, means connecting another of said elements to said driven member, and releasable means for arresting the element connected to said driving member to provide a fixed overdrive ratio between the input and output structures, said releasable drive means being released to allow rotation of said driving member free from its associated element when the overdrive ratio is operative.

13. A torque transmitting mechanism comprising input and output shafts, a clutch energized by rotation of the input shaft and connected to receive drive therefrom, means for transmitting the drive from the clutch to the output shaft, said means including a torque responsive element, and a clutch for bypassing the first-mentioned clutch and connecting the input and output shafts and energized by the torque responsive element whereby the second-named clutch is engaged when the output shaft is driven while the input shaft is stationary.

14. A torque transmitting mechanism comprising input and output shafts, a centrifugal clutch energized by rotation of the input shaft and connected to receive drive therefrom, means connecting said clutch and said output shaft for transmitting the drive from the clutch to the output shaft, said means including a torque responsive element, and a clutch for bypassing the first-mentioned clutch and connecting the input and output shafts and energized by the torque responsive element whereby the second-named clutch is engaged when the output shaft is driven while the input shaft is stationary.

15. A variable ratio torque transmitting mechanism comprising input and output structures, differential planetary gearing connecting said structures and comprising a ring gear element, a sun gear element, a planetary carrier element, planetary gears carried by said last-mentioned element, and meshing with said sun gear and ring gear elements, one of said elements being driven by said input structure, another of said elements being connected to said output structure, a hydrodynamic coupling device having driving and driven members, releasable drive means connecting one of said elements to said driving member, means connecting another of said elements to said driven member, and releasable means for arresting the element connected to said driving member to provide an overdrive speed ratio between the input and output structures, said releasable drive means being released to allow rotation of said driving member free from its associated element when the overdrive speed ratio is operative.

16. A variable ratio torque transmitting mechanism comprising input and output structures, planetary gearing connecting said structures and comprising three elements adapted to receive and deliver power to and from the gearing, one of said elements being driven by said input structure and another of said elements being connected to said output structure, a hydrodynamic coupling device having driving and driven members, releasable drive means connecting one of said elements to said driving member, means connecting another of said elements to said driven member, and releasable means for arresting the element connected to said driving member to provide an overdrive speed ratio between the input and output structures, said releasable drive means being released to allow rotation of said driving member free from its associated element when the overdrive speed ratio is operative.

17. A variable ratio torque transmitting mechanism comprising input and output structures, planetary gearing connecting said structures and comprising three elements adapted to receive and deliver power to and from the gearing, one of said elements being driven by said input structure and another of said elements being connected to said output structure, a torque multiplying device having driving and driven members, automatically releasable drive means connecting one of said elements to said driving member, means connecting another of said elements to said driven member, and releasable means for arresting the element connected to said driving member to provide an overdrive speed ratio between the input and output structures, said releasable drive means being released to allow rotation of said driving member free from its associated element when the overdrive speed ratio is operative.

DONALD W. KELBEL.

REFERENCES CITED

The following references are of record in the file of this patent:

UNITED STATES PATENTS

| Number | Name | Date |
| --- | --- | --- |
| 1,926,783 | Miller | Sept. 12, 1933 |
| 2,224,884 | Schneider | Dec. 17, 1940 |
| 2,332,593 | Nutt | Oct. 26, 1943 |
| 2,333,681 | Schneider | Nov. 9, 1943 |
| 2,341,512 | Burtnett | Feb. 15, 1944 |